(12) United States Patent
Dilliplane

(10) Patent No.: US 6,762,768 B2
(45) Date of Patent: Jul. 13, 2004

(54) METHOD AND APPARATUS FOR RENDERING AN OBJECT USING TEXTURE VARIANT INFORMATION

(75) Inventor: Steven C. Dilliplane, Yardley, PA (US)

(73) Assignee: ATI Technologies, Inc., Markham (CA)

( * ) Notice: Subject to any disclaimer, the term of this patent is extended or adjusted under 35 U.S.C. 154(b) by 0 days.

(21) Appl. No.: 09/088,601

(22) Filed: Jun. 1, 1998

(65) Prior Publication Data

US 2003/0146917 A1 Aug. 7, 2003

(51) Int. Cl.[7] .................................................. G09G 5/12
(52) U.S. Cl. ...................................... 345/582; 345/547
(58) Field of Search ................................. 345/430, 435, 345/429, 150, 418, 439, 426, 538, 547, 552, 582, 583, 584, 585, 586, 587, 588; 348/714, 715

(56) References Cited

U.S. PATENT DOCUMENTS

| | | | | |
|---|---|---|---|---|
| 5,495,563 A | * | 2/1996 | Winser ........................ | 345/582 |
| 5,706,417 A | * | 1/1998 | Adelson ..................... | 345/429 |
| 5,808,619 A | * | 9/1998 | Choi et al. .................. | 345/426 |
| 5,880,736 A | * | 3/1999 | Peercy et al. ............... | 345/426 |
| 5,949,424 A | * | 9/1999 | Cabral et al. ............... | 345/426 |
| 5,974,168 A | * | 10/1999 | Rushmeier et al. ......... | 382/141 |
| 6,052,126 A | * | 4/2000 | Sakuraba et al. ........... | 345/589 |
| 6,057,850 A | * | 5/2000 | Kichury ...................... | 345/430 |
| 6,057,851 A | * | 5/2000 | Luken et al. ............... | 345/586 |
| 6,064,395 A | * | 5/2000 | Miura ........................ | 345/589 |
| 6,078,334 A | * | 6/2000 | Hanaoka et al. ............ | 345/584 |
| 6,169,553 B1 | * | 1/2001 | Fuller et al. ................ | 345/427 |
| 6,175,368 B1 | * | 1/2001 | Aleksic et al. .............. | 345/430 |
| 6,226,006 B1 | * | 5/2001 | Collodi ...................... | 345/426 |
| 6,236,405 B1 | * | 5/2001 | Schilling et al. ........... | 345/582 |
| 6,239,807 B1 | * | 5/2001 | Bossut ....................... | 345/582 |

* cited by examiner

Primary Examiner—Michael Razavi
Assistant Examiner—Thu-Thao Havan
(74) Attorney, Agent, or Firm—Vedder, Price, Kaufman & Kammholz, P.C.

(57) ABSTRACT

A method and apparatus for rendering an object using texture variant information begins by determining at least one object invariant parameter based on at least one object parameter (i.e., the parameters used to render the object). The object invariant parameter may include at least one light vector, and/or invariant portion(s) of a texture map. Having obtained the object invariant parameter(s), a plurality of rendering elements are computed based on the object invariant parameter(s), texture coordinates of the object being rendered, and texture variant information. The plurality of rendering elements is calculated by encoding at least one of a plurality of texture parameters to obtain a texture map. Next, uniformed portions of the texture map are encoded into a corresponding texture variant table to produce a plurality of texture variants. Having produced the texture variants, at least one of them is selected based on texture coordinates of the object to produce at least one selected texture variant. The selected texture variant is then processed along with the object invariant parameter to produce the rendering elements. Having obtained the plurality of rendering elements, the object is rendered on a pixel by pixel basis.

22 Claims, 5 Drawing Sheets

METHOD AND APPARATUS FOR RENDERING AN OBJECT USING TEXTURE VARIANT INFORMATION

TECHNICAL FIELD OF THE INVENTION

This invention relates generally to video graphic circuitry and more particularly to video graphic circuitry that includes texture mapping.

BACKGROUND OF THE INVENTION

Computer systems are known to include a central processing unit, system memory, video graphics processing circuitry, audio processing circuitry, and peripheral ports. The peripheral ports allow the central processing unit to access peripheral devices such as monitors, printers, external tape drives, video sources, etc., which facilitate in the execution of computer applications. Such computer applications include word processing applications, drawing applications, painting applications, spreadsheet applications, video games, broadcast television signals, cable television signals, etc. For example, as a central processing unit processes an application, it provides image data to the video graphics circuitry, which, in turn, processes the image data and provides the processed image data to a monitor.

At a minimum, the image date provided by the central processing unit includes physical coordinates of an object with respect to the display coordinates and color information. Such basic image data is typical for two-dimensional images of word processing applications, drawing applications, presentation applications, etc. For more complex display options, such as three-dimensional imagery, the image data, i.e., object parameters, may further include texture coordinates, alpha-blending parameters, and/or bump map coordinates. The texture coordinates correlate the object to a particular texture map such that the object's surface has a pattern of the texture map. The alpha-blending parameters indicate the translucency of the object. If the object is solid (i.e., not translucent), the alpha-blending value will be a one. If the object is translucent, the alpha-blending value will indicate the level of translucency in the range of 0 (e.g., transparent) to one (e.g., solid).

The bump map coordinates relate the object to a bump map, which includes a topological representation of roughness that may be imposed upon the surface of the object. In general, providing a "bumped" surface, which may be referred to as applying a shading function, on an object is done on a pixel by pixel basis. The bumping process (i.e., providing an appearance of roughness to a surface) begins by determining a normal vector (N) of the object, where the normal vector is perpendicular to the planer surface of the object. Next, a bump vector ($\Delta N$) is determined by using the partial derivatives at a point O (the mapping coordinates) on the surface along the u and v directions (u and v are the axes of the bump surface), the partial derivatives obtain the normal vector N as $N=O_u \times O_v$ and defined two additional vectors $\zeta=N \times O_v$, $\tau=N \times O_u$ to form a local coordinate system. Then perturbation $\Delta N$ is defined as $\Delta N=B_u \zeta - B_v \tau$ where $B_u$ and $B_v$ are the partial derivatives of the bump map B (u, v). Note that $\Delta N$ is a vector in the plane of $\zeta$ and $\tau$, which implies it is also on the surface. The shading results from the Lambertian shading formula:

$$\frac{(N+\Delta N) \cdot L}{|N+\Delta N| \times |L|} = \frac{N \cdot L}{|N+\Delta N| \times |L|} + \frac{\Delta N \cdot L}{|N+\Delta N| \times |L|}$$

These mathematical steps must be taken for each pixel of the object to apply the shading function to the object. Due the complex nature of the equations and the processing power required to execute them, bump mapping is cost prohibitive for all but the very high-end computer products that have significant memory and processing resources.

Therefore, a need exists for a method and apparatus that provides texture mapping, which includes bump mapping, without the computational overhead of existing texture and/or bump mapping techniques.

DETAILED DESCRIPTION OF A PREFERRED EMBODIMENT

Generally, the present invention provides a method and apparatus for rendering an object using texture variant information. Such processing begins by determining at least one object invariant parameter based on at least one object parameter (i.e., the parameters used to render the object). The object invariant parameter may include at least one light vector, and/or invariant portion(s) of a texture map. Having obtained the object invariant parameter(s), a plurality of rendering elements are computed based on the object invariant parameter(s), texture coordinates of the object being rendered, and texture variant information. The plurality of rendering elements is calculated by encoding at least one of a plurality of texture parameters to obtain a texture map. Next, uniformed portions of the texture map are encoded into a corresponding texture variant table to produce a plurality of texture variants. Having produced the texture variants, at least one of them is selected based on texture coordinates of the object to produce at least one selected texture variant. The selected texture variant is then processed along with the object invariant parameter to produce the rendering elements. Having obtained the plurality of rendering elements, the object is rendered on a pixel by pixel basis. With such a method and apparatus, the computational overhead associated with pixel level processing (e.g., bump mapping as described in the background section), has been substantially reduced. Thus, allowing texture mapping, which includes bump mapping, to be economically included in commercial grade video graphic processing circuits.

Figure 1:
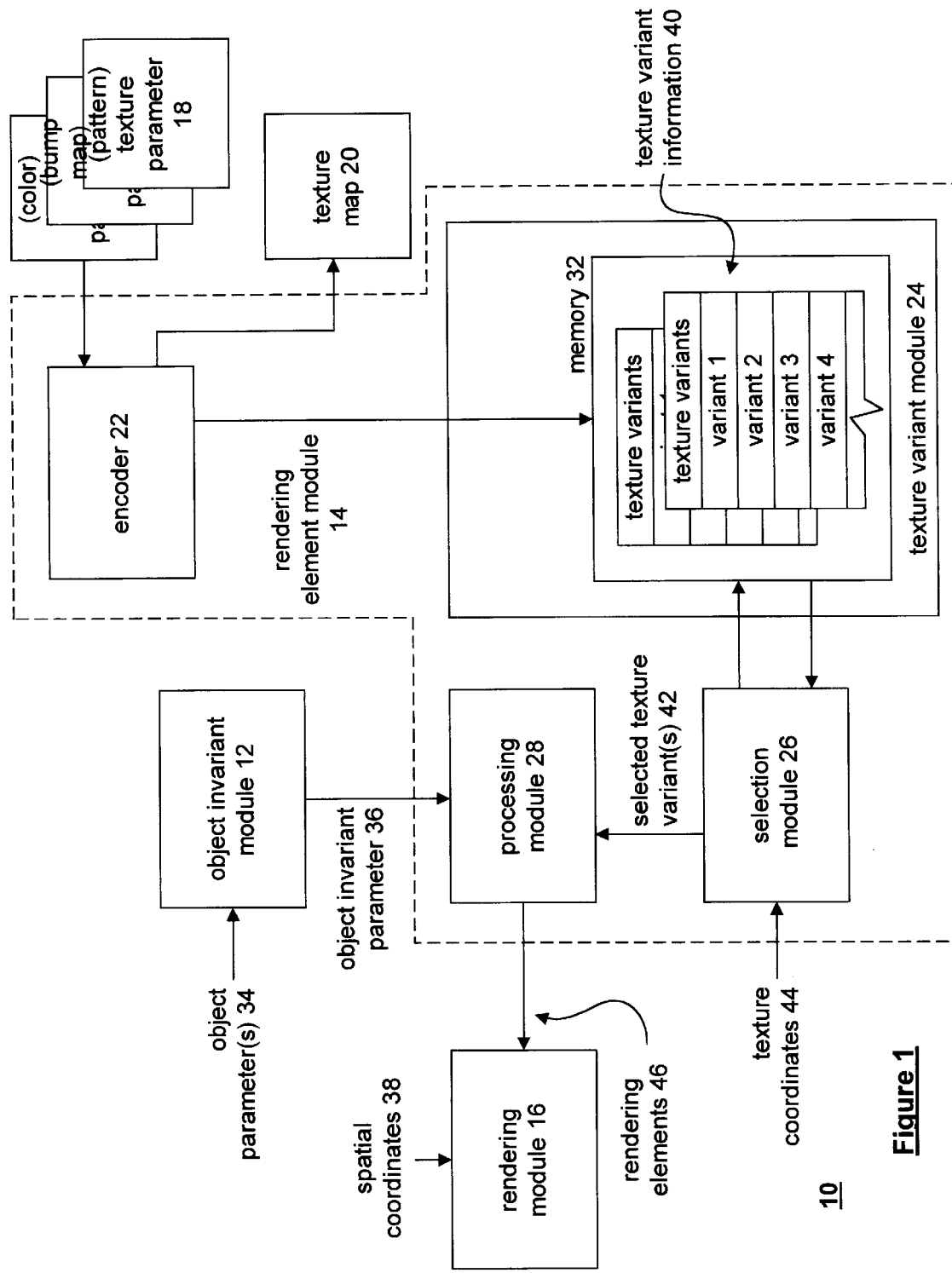
FIG. 1 illustrates a schematic block diagram of a video processor in accordance with the present invention.

The present invention can be more fully described with reference to FIGS. 1 through 6. FIG. 1 illustrates a schematic block diagram of a video processor 10 that includes an object invariant module 12, a rendering element module 14, a rendering module 16, a plurality of texture parameters 18, and a texture map 20. The plurality of texture parameters 18 and the texture map 20 may be stored in system memory of a computer system, may be stored in local memory associated with the video processor 10, or in any combination thereof. Further note that modules 12, 14 and 16 may be implemented as stand alone hardware devices, firmware modules and/or software modules operating on a processing module. The processing module may be a microprocessor, central processing unit, microcontroller, digital signal processor, and/or any other device that manipulates digital information based on programming instructions.

The object invariant module 12 is operably coupled to receive object parameters 34 of an object to be rendered. The object parameters 34 include physical coordinates of an object, texture coordinates corresponding to the plurality of texture parameters 18, alpha-blending information, fog information, reflection information and/or any other information needed to render the object. Based on the object parameters 34, the object invariant module 12 determines an object invariant parameter 36 for the object. The object invariant parameter 34 corresponds to a uniform property with respect to the object. For example, the uniform property may be a distant light vector, a close light vector, a plurality of light vectors, and/or a texture value. If the rendering of the image includes a single distant light vector, the light vector has a uniform relationship with respect to the normal vector of the pixels of the object. As such, the light vector is invariant for the current object, which can be calculated at the object level. If the object invariant parameter is a texture value, it relates to one or more of the texture parameters 18 that, when mapped to the object, includes all of the same values. For example, if the object has texture coordinates within a texture parameter 18 wherein each of the texels are of the same value, the object has a uniform property with respect to that particular texture parameter. As such, the texels, or texture value, could be considered an object invariant parameter 36.

The rendering element module 14 includes an encoder 22, a texture variant module 24, a selection module 26, and a processing module 28. The texture variant module 24 includes memory 32 for storing the texture variant information 40. In operation, the encoder 22 is operably coupled to retrieve information from the texture parameters 18. Such texture parameters may include a pattern, bump map information, materials (e.g., plastic, gold, silver, wood, etc.) color, and/or any other information that may be represented in a texture mapping process. Based on this information, the encoder 22 encodes the texture parameters 18 to produce the texture map 20. In essence, the encoder 22 encodes by combining the parameters at a texel level (i.e., at each coordinate of the texture coordinate system) to produce the texture map 20. Such an encoding process will be discussed in greater detail with reference to FIG. 2.

The encoder 22, at the object level, utilizes the information in the texture map 20 to produce a plurality of texture variants. The texture variants are determined based on the texture coordinates of the particular object being rendered and retrieving the appropriate information from the texture map 20. The corresponding portions of the texture map 20 retrieved by the encoder 22 are encoded by combining uniform portions of the texture map into a corresponding texture variant. Such an encoding process will be discussed in greater detail with reference to FIG. 2.

The selection module 26 is operably coupled to receive texture coordinates 44 of an object and/or physical coordinates of an object, and to retrieve a corresponding texture variant from the texture variant module 24. The selected texture variant(s) 42 is subsequently provided to the processing module 28. As such, the selection module 26 receives the texture coordinates 44 and utilizes them to address memory 32 to retrieve the appropriate texture vibrant. Such a process of selecting the texture variant will be discussed in greater detail with reference to FIG. 3.

The processing module 28 is operably coupled to receive the selected texture variant(s) 42 and the object invariant parameter 36. Based on these inputs, the processing module 28, produces the rendering elements 46. The rendering elements 46 are provided to the rendering module 16, which also receives the spatial coordinates, or physical coordinates 38, of the object being rendered. Based on these inputs, the rendering module 16 produces, on a pixel by pixel basis, the rendered image. The rendering process may be equivalent to the rendering process found in ATI Technologies video graphic circuits such as Rage Pro, Rage 128, etc. As such, no further discussion of the rendering module will be provided except to further illustrate the present invention.

Figure 2:
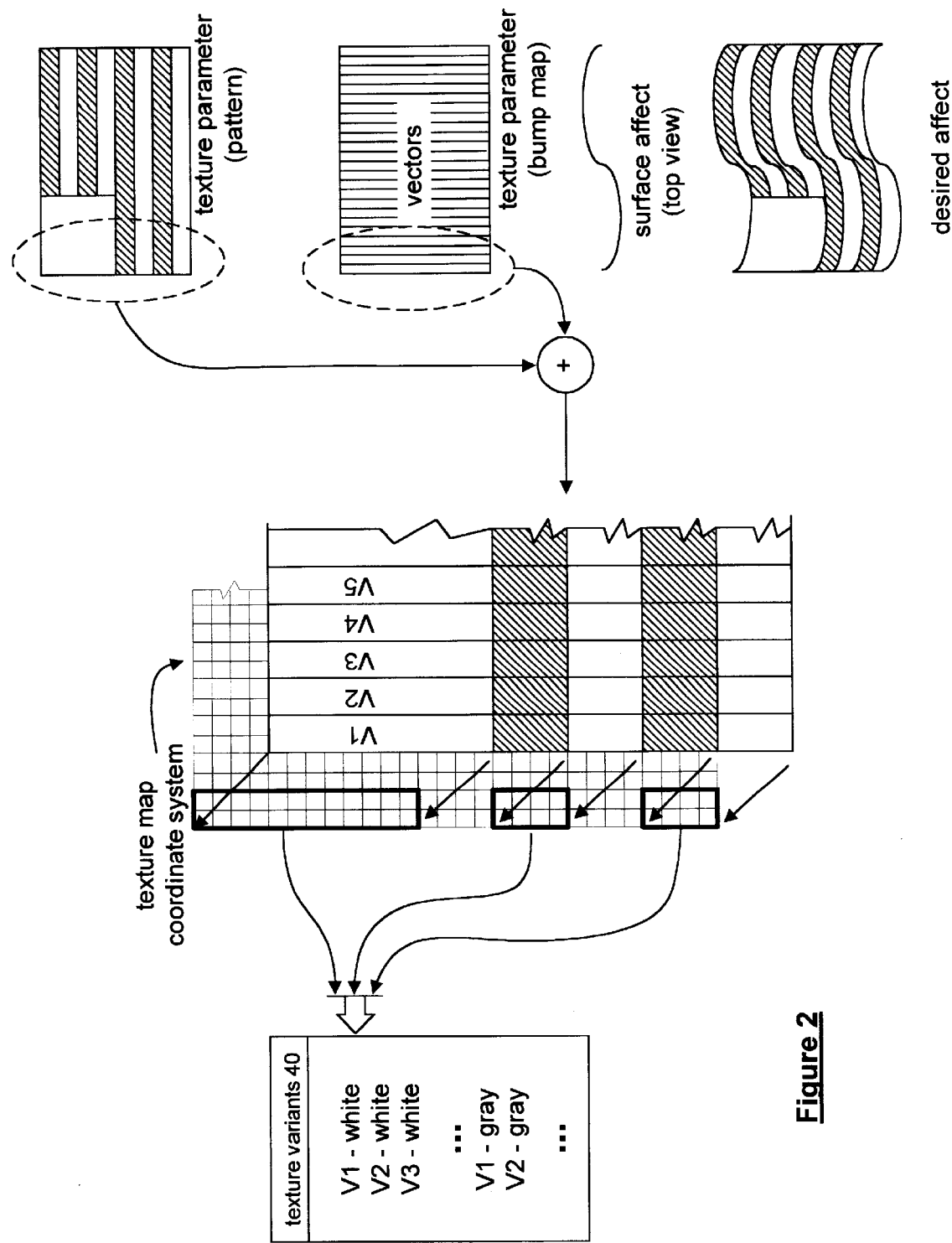
FIG. 2 illustrates a graphical representation of the generation of texture variant information in accordance with the present invention.

FIG. 2 illustrates a graphical representation of the generation of a texture map and texture variants in accordance with the present invention. As shown at the right portion of the figure, a first texture parameter includes a pattern which corresponds to a flag. The second texture parameter, which may be a bump map, provides a plurality of vectors. The illustration immediately below the bump map texture parameter indicates the desired surface effect of the vectors. As such, the plurality of the vectors in the bump map texture parameter is a plurality of vectors that offset the normal vector of the object by a given ratio to produce the desired waving effect. The bottom right portion of FIG. 2 illustrates the desired effect of combining the pattern texture parameter with the bump map texture parameter. As shown, the desired effect is a waving flag.

The texture map 20 is created by combining the texture parameters at each texture map coordinate. The center portion of FIG. 2 illustrates a texture map coordinate system having a T direction and an S direction. The T direction is in the horizontal direction and the S direction is in the vertical direction. By combining the texture parameters at each texture map coordinate (i.e., texel), the texture map is created. For example, the circled portions of the texture parameters are combined to produce a portion of the texture map. As shown, the upper-left portion of the texture map includes a white section having a corresponding vector V-1. Each color along the furthest left edge of the texture map has the same corresponding vector V-1. The next left portion of the texture map has vector V-2 and the corresponding colors of the flag. The next section has vector V-3 and the corresponding colors of the flag. Such combining continues to produce the texture map 20. As one of average skill in the art would appreciate, additional texture parameters may be added to produce a more complex texture map.

Once the texture map 20 has been created, each uniformed section of the texture map is mapped to a texture variant 40. As shown, the first entry in the texture variant table includes vector V-1 having a white color. The highlighted portions of the texture map includes three sections, each having the vector V-1 and color white. Thus, each of these texture coordinates is mapped to a single texture variant. As such, the texture variant 40 is an encoded representation of the texture map 20, whereby multiple texture coordinates are represented by a single texture variant.

Figure 3:
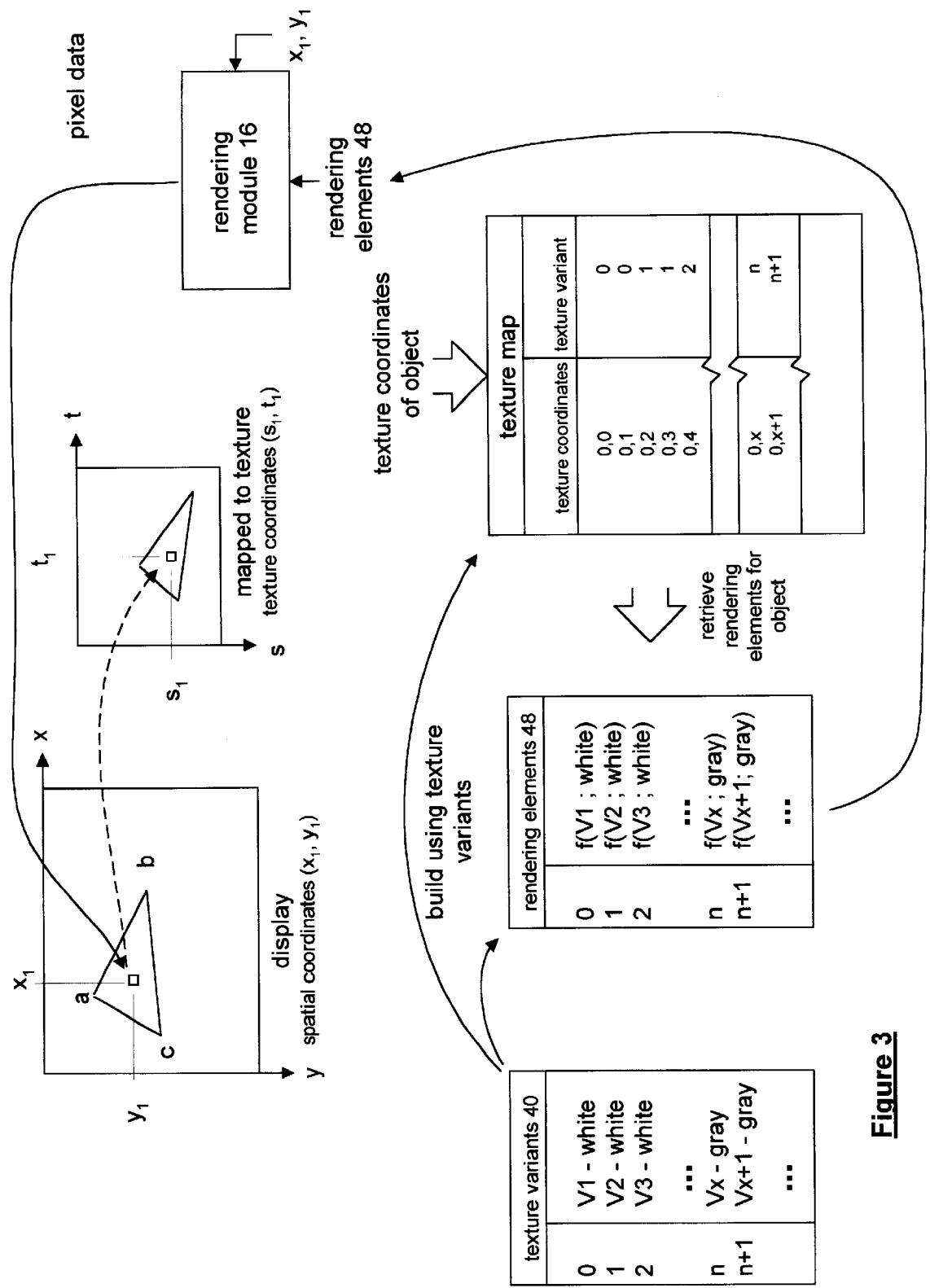
FIG. 3 illustrates a graphical representation of utilizing texture variant information in accordance with the present invention.

Having created the texture variant table 40, an object is ready to be rendered, which is illustrated in FIG. 3. As shown in the upper-portion of FIG. 3, the object is defined by its parameters, where the object parameters include spatial coordinates of the vertices (a, b, and c) of the object, texture coordinates, color information, and/or any other information needed to render the object. The illustration depicts a pixel located at x1, y1, which is currently being rendered. Having obtained the spatial coordinates for the pixel, they are mapped to texture coordinates (s1, t1) of a graphical representation of the texture map (shown in the upper middle portion of FIG. 3).

The computed texture map (shown in the lower right portion of FIG. 3) includes each texture coordinate of a texture map and the associated texture variant. As shown, the first entry corresponds to texture coordinate 00 having a texture variant of 0, the second entry to texture coordinate 01 having the texture variant of 0, etc. The texture variant is used to address the rendering element 48 table to retrieve the appropriate rendering element 48.

As shown, the rendering element table is built based on the texture variants 40 and a particular function. The particular function executes a function upon the texture variant and the texture invariant parameter. For example, if texture invariant parameter is a light vector, the function is a vector multiplication operation to produce a bump mapping effect for the object. Alternatively, the function could be based on invariant portions of the texture map. The addressed rendering element 48 is then provided to the rendering module 16 to produce the pixel data that is subsequently displayed at the corresponding spatial coordinates. As one of average art would appreciate, the generation of the texture map and the texture variants is done once, provided the texture parameters do not change. The generation of the rendering elements and the texture invariant parameters is done at the object level. Thus, the only processing done at the pixel level is the rendering of the particular pixels. As such, by shifting texture-related computations up the processing stream, i.e., at the object level or higher, fewer computations are performed at the pixel level. As such, computational resources (memory and processing power) are saved.

Figures 4, 5:
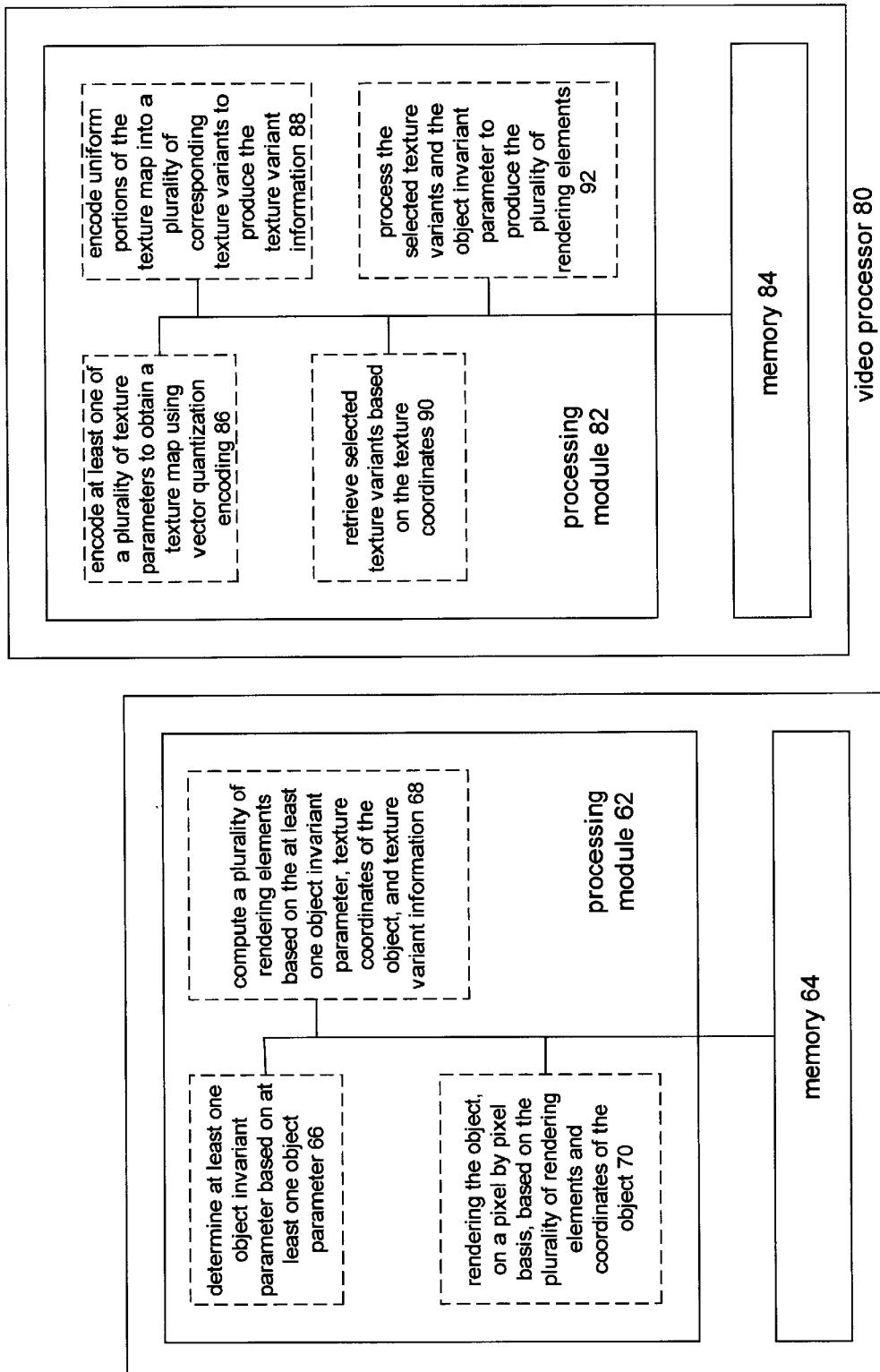
FIG. 4 illustrates a schematic block diagram of an alternate video processor in accordance with the present invention.
FIG. 5 illustrates a schematic block diagram of another video processor in accordance with the present invention.

FIG. 4 illustrates a schematic block diagram of a video processor 60 that includes a processing module 62 and memory 64. The processing module 62 may be a microprocessor, microcontroller, digital signal processor, microcomputer, central processing unit, and/or any device that manipulates digital information based on programming instructions. The memory 64 may be read-only memory, random access memory, hard disk memory, magnetic tape memory, and/or any device that stores digital information.

The memory 64 stores programming instructions that, when read by the processing module 62, cause the processing module to function as a plurality of circuits 66–70. While reading the programming instructions, the processing module functions as circuit 66 to determine at least one object invariant parameter based on at least one object parameter. The processing module then functions as circuit 68 to compute a plurality of rendering elements based on the at least one object invariant parameter, texture coordinates of the object, and texture variant information. The processing module 62 then functions as circuit 70 to render the object, on a pixel-by-pixel basis, based on the plurality of rendering elements and coordinates of the object. The programming instructions stored in memory 64 and the execution thereof by processing module 62 will be discussed in greater detail with reference to FIG. 6.

FIG. 5 illustrates another video processor 80 that includes a processing module 82 and memory 84. The processing module 82 may be a microprocessor, microcontroller, microcomputer, digital signal processor, central processing unit, and/or any device that manipulates digital information based on programming instructions. The memory 84 may be read-only memory, random access memory, reprogrammable memory, floppy disk memory, magnetic tape memory, and/or any device that stores digital information.

The memory 84 stores programming instructions that, when read by processing module 82, causes the processing module 82 to function as a plurality of circuits 82–92. While reading the programming instructions, the processing module 82 functions as circuit 86 to encode at least one a plurality of texture parameters to obtain a texture map using vector quantization encoding. Next, the processing module functions as circuit 88 to encode uniform portions of the texture map into a plurality of corresponding texture variants to produce the texture variant information. The processing module then functions as circuit 90 to retrieve selected texture variants based on the texture coordinates. The processing module then functions as circuit 92 to process the selected texture variant and the object invariant parameter to produce the plurality of rendering elements. The programming instructions stored in memory 84 and the execution thereof by processing module 82 will be discussed in greater detail with reference to FIG. 6.

Figure 6:
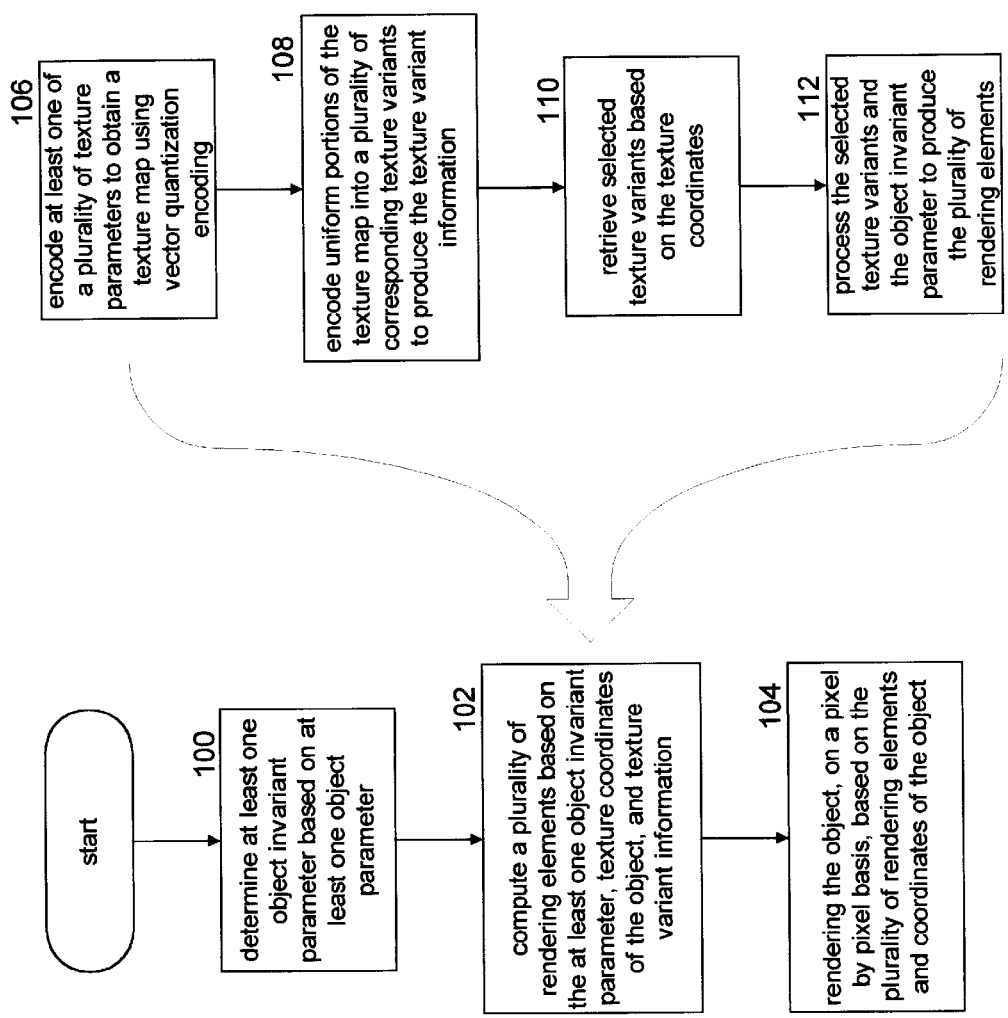
FIG. 6 illustrates a logic diagram of a method for utilizing texture variant information in accordance with the present invention.

FIG. 6 illustrates a logic diagram of a method for rendering an object using texture variant information. The process begins at step 100 where at least one object invariant parameter is determined based on at least one object parameter. The object invariant parameter corresponds to a uniform property with respect to the object, wherein the uniform property includes at least one of a light vector and a texture value. The texture value corresponds to a uniformed portion, with respect to the object, of the texture map and/or texture parameters. The process then proceeds to step 102 where a plurality of rendering elements are computed based on the at least one object invariant parameter, the texture coordinates of the object, and texture variant information. The generation of the texture variant information will be discussed subsequently.

The process then proceeds to step 104 where the object is rendered, on a pixel by pixel basis, based on the plurality of rendering elements and the coordinates of the object. Such rendering produces pixel information that is subsequently provided to a display driver which in turn is provided to a display.

The generation of the texture variant information begins at step 106 where at least one of a plurality of texture parameters is encoded, based on vector quantization encoding, to obtain a texture map. The texture parameters include at least one of texture information, bump information, color information, material property information, alpha-blending information and/or fogging information. The process then proceeds to step 108 where uniform portions of the texture map are encoded into a plurality of corresponding texture variants to produce the texture variant information.

The process then proceeds to step 110 where selected texture variants are retrieved based on the texture coordinates of the object being rendered. The process then proceeds to step 112 where the selected texture variants are processed along with the object invariant parameters to produce the plurality of rendering elements. The processing may include performing a function upon the texture variants and/or the object invariant parameters. For example, a light vector may be applied to the texture invariant to provide bump effects.

The preceding discussion has presented a method and apparatus for rendering an object utilizing texture mapping, which includes bump mapping, with much less computational overhead than in previous embodiments. The computational savings arise by performing as many texture functions at the object level as opposed to the pixel level. As such, the texture variant information generated for each object reduces the computational overhead.

What is claimed is:

1. A method for rendering an object, the method comprises the steps of:
   a) determining at least one object invariant parameter based on at least one object parameter;
   b) computing a plurality of rendering elements based on the at least one object invariant parameter texture coordinates of the object, and texture variant information;
   c) encoding, via vector quantization encoding, at least one of a plurality of texture parameters to obtain a texture map;
   d) generating the texture variant information based on the texture map; and
   e) rendering the object, on a pixel by pixel basis, based on the plurality of rendering elements arid coordinates of pixels of the object.

2. The method of claim 1, wherein the at least one object invariant parameter corresponds to a uniform property with respect to the object, wherein the uniform property includes at least one of: a light vector and a texture value.

3. The method of claim 1, wherein the plurality of texture parameters includes: texture information, bump information, color information, material property information, alpha blending information, and fogging information.

4. The method of claim 1, wherein the step of generating the texture variant information further comprises encoding each uniform portion of the texture map into a corresponding texture variant to produce a plurality of texture variants.

5. The method of claim 4, wherein step (b) further comprises:
   retrieving selected texture variants of the plurality of texture variants based on the texture coordinates; and
   processing the selected texture variants and the object invariant parameter to produce the plurality of rendering elements.

6. The method of claim 5, wherein the object invariant parameter includes at least one light vector, and wherein the step of processing further comprises manipulating the selected texture variants based on the at least one light vector.

7. A method for generating rendering elements, the method comprises the steps of:
   a) encoding at least one of a plurality of texture parameters to obtain a texture map encoding via vector quantization encoding;
   b) encoding each uniform portion of the texture map into a corresponding texture variant to produce a plurality of texture variants;
   c) selecting at least one of the plurality of texture variants based on texture coordinates of an object to be rendered to produce at least one selected texture variant; and
   d) processing the at least one selected texture variant and an object invariant parameter to produce the rendering elements.

8. The method of claim 7, wherein the object invariant parameter corresponds to a uniform property with respect to the object, wherein the uniform property includes at least one of: a light vector and a texture value.

9. The method of claim 8, wherein step (d) further comprises manipulating the at least one selected texture variant based on the light vector.

10. The method of claim 8, wherein step (d) further comprises performing a function upon the texture value and the at least one selected texture variant.

11. A video processor comprises:
    an object in variant module operably coupled to the set-up module, wherein the object invariant module generates at least one object invariant parameter based on at least one object parameter;
    rendering element module operably coupled to the object invariant module, wherein the rendering element module computes a plurality of rendering elements based on the at least one object invariant parameter, texture coordinates of the object, and texture variant information;
    an encoder operably coupled to access a plurality of texture parameters, wherein the encoder encodes at least one of the plurality of texture parameters to produce a texture map;
    a texture variant module operably coupled to access the texture map, wherein the texture variant module generates the texture variant information based on the texture map; and
    a rendering module operably coupled to the rendering element module and the set-up module, wherein the rendering module renders the object, on a pixel by pixel basis, based on the plurality of rendering elements and coordinates of pixels of the object.

12. The video processor of claim 11, wherein the object invariant module generates the at least one object invariant parameter based on a uniform property with respect to the object, wherein the uniform property includes at least one of: a light vector and a texture value.

13. The video processor of claim 11, wherein the encoder further functions to:
    encode each uniform portion of the texture map into a corresponding texture variant to produce a plurality of texture variants.

14. The video processor of claim 13, wherein the rendering element module further comprises:
    a selection module operably coupled to the encoder of the texture variant module, wherein the selection module selects at least one of the plurality of texture variant based on the texture coordinates to produce at least one selected texture variant; and
    a processing module operably coupled to the selection module, wherein the processing module processing the at least one selected texture variant and the at least one object invariant parameter to produce the rendering elements.

15. A video processor comprises:
    a processing module; and
    memory operably coupled to the processing module, wherein the memory stores programming instructions that, when read by the processing module, cause the processing module to: (a) determine at least one object invariant parameter based on at least one object parameter; (b) compute a plurality of rendering elements based on the at least one object invariant parameter, texture coordinates of the object, and texture variant information; (c) encode via vector quantization encoding, at least one of a plurality of texture parameters to obtain a texture map; (d) generate the texture variant information based on the texture map; and (e) render the object, on a pixel by pixel basis, based on the plurality of rendering elements and coordinates of pixels of the object.

16. The video processor of claim 15, wherein the memory further comprises programming instructions that cause the processing module to determine the at least one object invariant parameter based on a uniform property with respect to the object, wherein the uniform property includes at least one of: a light vector and a texture value.

17. The video processor of claim 15, wherein the memory further comprises programming instructions that cause the processing module to generate the texture variant information by encoding each uniform portion of the texture map into a corresponding texture variant to produce a plurality of texture variants.

18. The video processor of claim 15, wherein the memory further comprises programming instructions that cause the processing module to:
retrieve selected texture variants of the plurality of texture variants based on the texture coordinates; and
process the selected texture variants and the object invariant parameter to produce the plurality of rendering elements.

19. A video processor comprises:
a processing module; and
memory operably coupled to the processing module, wherein the memory stores programming instructions that, when read by the processing module, cause the processing module to: (a) encode at least one of a plurality of texture parameters to obtain a texture map via vector quantization encoding; (b) encode each uniform portion of the texture map into a corresponding texture variant to produce a plurality of texture variants; (c) select at least one of the plurality of texture variants based on texture coordinates of an object to be rendered to produce at least one selected texture variant; and (d) process the at least one selected texture variant and an object invariant parameter to produce the rendering elements.

20. The video processor of claim 19, wherein the object invariant parameter corresponds to a uniform property with respect to the object, wherein the uniform property includes at least one of: a light vector and a texture value.

21. The video processor of claim 20, wherein the memory further comprises programming instructions that cause the processing module to manipulate the at least one selected texture variant based on the light vector.

22. The video processor of claim 20, wherein the memory further comprises programming instructions that cause the processing module to perform a function upon the texture value and the at least one selected texture variant.

* * * * *